United States Patent [19]

Clark, Jr.

[11] 4,327,405
[45] Apr. 27, 1982

[54] VOLTAGE SUPPRESSION CIRCUIT FOR A DC-TO-DC VOLTAGE CONVERTER CIRCUIT

[75] Inventor: Charles A. Clark, Jr., Chatsworth, Calif.

[73] Assignee: Sperry Corporation, New York, N.Y.

[21] Appl. No.: 150,285

[22] Filed: May 16, 1980

[51] Int. Cl.³ .................... H02H 7/122; H02M 3/335
[52] U.S. Cl. ........................................ 363/56; 363/21
[58] Field of Search ................................. 363/18–21, 363/50, 55, 56, 131; 323/17, DIG. 1, 282–290; 361/18

[56] References Cited

U.S. PATENT DOCUMENTS

| 3,736,495 | 5/1973 | Calkin et al. | 323/DIG. 1 |
| 4,016,482 | 4/1977 | Cielo et al. | 363/56 X |
| 4,063,306 | 12/1977 | Perkins et al. | 363/56 X |
| 4,065,713 | 12/1977 | Pollmeier | 323/DIG. 1 |

Primary Examiner—William M. Shoop
Assistant Examiner—Peter S. Wong

Attorney, Agent, or Firm—Howard P. Terry

[57] ABSTRACT

In a voltage conversion circuit, comprising a source of input DC voltage, an input voltage switching circuit and a transformer having a primary winding coupled in series with the switching circuit and input DC voltage for periodically receiving DC voltage thereat and having a secondary winding connected to a DC output circuit for producing a DC output voltage of a given polarity, the transformer primary normally undesirably produces a switching circuit damaging voltage spike of a polarity opposite the given polarity upon the voltage being removed from the transformer primary by the switching circuit. A voltage suppression circuit is responsive to the voltage polarity reversal in the transformer primary, which occurs when the input voltage is removed therefrom for storing the energy which would otherwise produce the voltage spike. In response to the switching circuit thereafter applying the DC input voltage to the transformer primary, the stored energy is then connected to the DC output circuit to add energy thereto.

3 Claims, 2 Drawing Figures

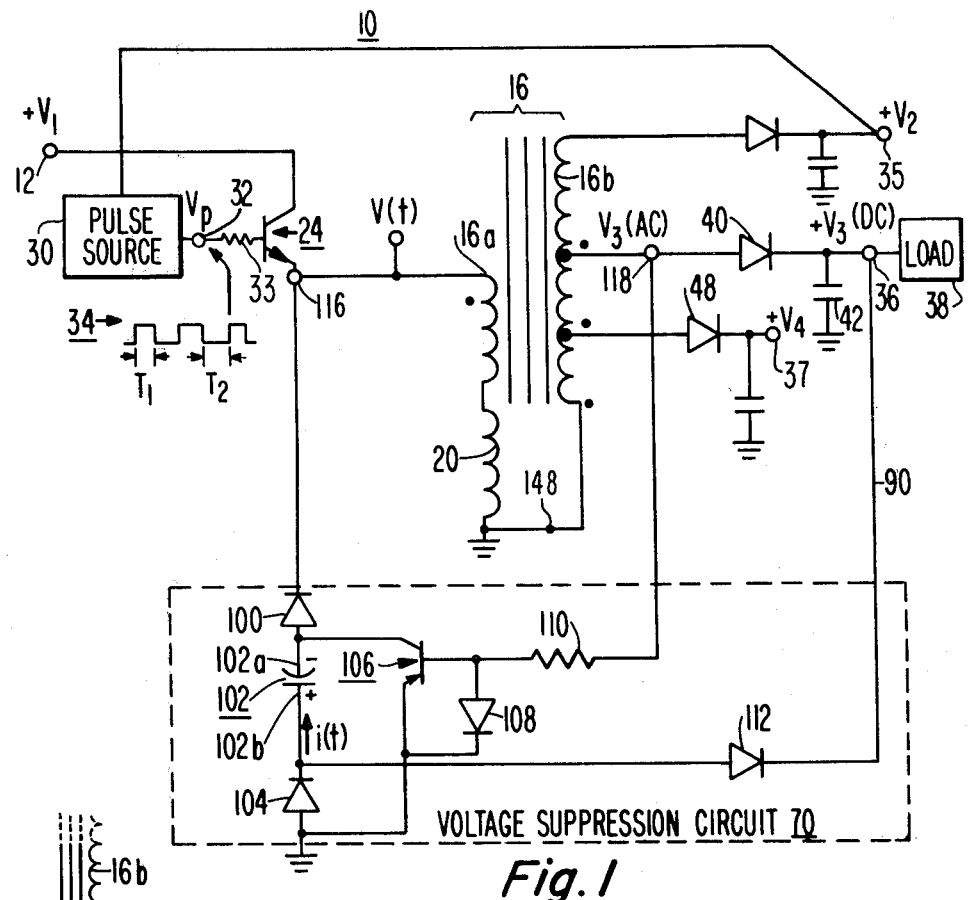
Fig. 1
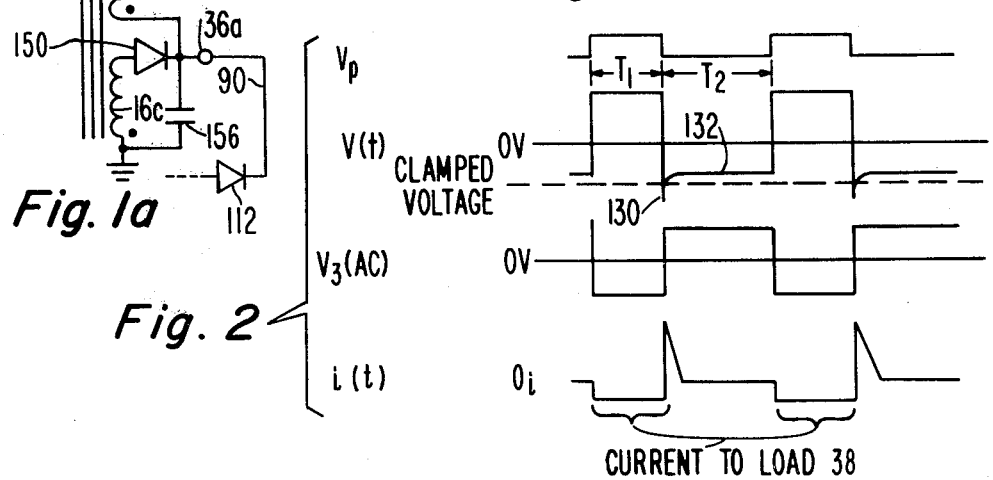
Fig. 1a
Fig. 2

VOLTAGE SUPPRESSION CIRCUIT FOR A DC-TO-DC VOLTAGE CONVERTER CIRCUIT

This invention relates to a DC-to-DC voltage converter circuit involving a DC input voltage and a transformer and more particularly to the elimination of voltage spikes therein. In a DC-to-DC converter of the single ended or flyback type used in a power supply, a switching means such as a switching transistor is switched on to charge the primary winding of the transformer. When the switching transistor is switched off, the stored energy in the primary winding causes the primary winding to reverse polarity and flyback to a voltage which provides the proper voltage to the transformer secondary winding or windings. A real transformer undesirably has finite leakage reactance due to imperfect coupling of the primary and secondary windings. Because of the leakage reactance a very high voltage spike appears at the junction of the transformer primary and switching transistor which is normally coupled to the transformer secondary load to provide energy thereto. If not reduced, the voltage spike will typically destroy the switching transistor. It is common to use a power dissipative clamp such as a Zener diode or resistor-capacitor network across the transformer primary to protect the transistor, but such an arrangement wastes power. It is also known to connect the spike energy to a DC output circuit connected to the transformer secondary by means of a diode, for example to pass the otherwise wasted energy to the DC otput circuit. However, if the voltage spike is of opposite polarity to that of the DC output circuit the spike cannot be passed from the transformer primary to the DC output circuit by means of a diode.

In accordance with a preferred embodiment of the invention, in a voltage converter receptive of input DC power which includes a transformer having a primary winding and a secondary winding, a DC output circuit connected to the secondary winding and producing a DC output voltage of a given polarity and switch means for periodically alternately applying and removing input power to the primary winding and wherein the transformer primary normally produces a voltage spike of polarity opposite to the given polarity when power is removed therefrom, a means is responsive to power being removed from the transformer for storing the energy produced by the transformer when power is removed from it which would otherwise produce the voltage spike. A means is responsive to power being applied thereafter to the transformer primary for passing the energy from the storage means to the DC output circuit.

In the drawing:

FIG. 1 is a schematic drawing of a DC-to-DC converter circuit employing a voltage suppression circuit in accordance with a preferred embodiment of the instant invention;

FIG. 1a is a modification of a portion of the voltage suppression circuit of FIG. 1; and FIG. 2 is a set of waveforms useful in understanding the operation of the circuit of FIG. 1.

Referring now to FIG. 1, a source of direct current (DC) voltage is applied between terminal 12 and circuit ground of a DC-to-DC converter 10. Terminal 12, at voltage value $+V_1$ relative to ground, is coupled to the collector of an NPN switching transistor 24, the emitter of which is connected at terminal 116 to the primary winding 16a of a flyback type transformer 16. Primary winding 16a is illustrated in series with a leakage reactance (inductance 20) which, in reality, is not a lumped element as illustrated but is rather a distributed inductance. Inductance 20 is connected to circuit ground. A pulse source 30 of voltage $V_p$ is connected at terminal 32 to the base of transistor 24 via resistor 33 and produces a periodically pulsed waveform in the form of a series of pulses of relatively high value and of time duration $T_1$ alternating with a series of pulses of relatively low value and of time duration $T_2$. These pulses are indicated at waveform 34.

The secondary winding 16b of transformer 16 typically includes several taps connected to associated rectifying circuits to produce various DC output voltages some of which may be above $V_1$ in value and some of which may be below $V_1$ in value. In FIG. 1, three such taps are shown producing $+V_2$, $+V_3$, and $+V_4$ volts respectively relative to ground at output terminals 35, 36, and 37 respectively one end of transistor secondary winding 16b is connected to ground. In FIG. 1, each of the rectifying circuits comprises a single diode such as diode 40 and an appropriate energy storage capacitor such as capacitor 42 connected between the secondary winding and ground with the junction of the diode (such as diode 40) and the capacitor (such as capacitor 42) connected to the output terminal (such as terminal 36). Also, any one of the output DC voltages such as $+V_2$ is typically fed back to pulse source 30 to provide feedback signals thereto to thereby control the on and off periods $T_1$ and $T_2$, respectively of signals produced at terminal 32 by pulse source 30 and thereby control the output voltages in known conventional fashion.

The emitter of transistor 24 is at one end of series connection which includes in order a diode 100, a capacitor 102, and a second diode 104 of a voltage suppression circuit 70. The cathode of diode 104 is coupled via a third diode 112 and via conductor 90 to terminal 36 to pass current i(t) thereto as will be described. The anode of diode 100 is coupled to the collector of a PNP transistor 106. The emitter of transistor 106 is connected to ground. The base of transistor 106 is series coupled through a resistor 110 to terminal 118 which, for example, is the tap on transformer secondary 16b connected to diode 40. A diode 108 is coupled between the base and emitter of transistor 106.

The DC voltage point (relative to ground) to which diode 112 is connected must be of a nominal value which is slightly lower in magnitude than the voltage to be coupled thereto, namely the voltage on capacitor 102. If all desired DC output voltages such as $+V_2$, $+V_3$ and $+V_4$ are higher than the voltage from capacitor 102, as illustrated in FIG. 1a, an additional secondary winding 16c, and an additional rectifying circuit comprising, a diode 150 and a capacitor 156 may be inserted in a break at point 148 of FIG. 1 between winding 16b and ground. In this case conductor 90 is connected, not to terminal 36 in FIG. 1, but to terminal 36a in FIG. 1a. The additional winding 16c is chosen to produce the desired voltage at terminal 36a. The additional circuit operates in the same manner as will now be described for the main circuit.

Operation of the circuit of FIG. 1 will now be described with appropriate reference to the waveforms of FIG. 2, which relate to voltage and current waveforms appearing at various places in FIG. 1. Transistor 24 is periodically switched on and off by pulses from pulse source 30. The transistor 24 is switched on during the part of the cycle when the waveform is high (during times corresponding to time duration $T_1$ in waveform 34) and is turned off when the waveform 34 is low (during the part of the cycle corresponding to time duration $T_2$). A complete cycle is of duration, $T_1+T_2$.

In a steady state operation, it will be assumed that the voltage across capacitor 102 is equal to the sustaining negative voltage line 132 (less two diode drops), FIG. 2 waveform V(t) due to charging on previous cycles. When transistor 24 is conductive approximately $+V_1$ volts is applied at emitter terminal 116 to primary winding 16a. Thereafter, when transistor 24 is turned off, during a time interval $T_2$, terminal 116 reverses polarity becoming negative due to the inductance of primary winding 16a, and with a superimposed large negative voltage spike caused by leakage reactance 20 as illustrated at 130 in FIG. 2, waveform V(t). In the absence of circuit 70, the large negative spike may be of value sufficient to damage transistor 24. As a result of the reversal of voltage in winding 16a, the voltage $V_3(AC)$ at terminal 118 and at other taps of secondary 16b goes positive. This is illustrated in FIG. 2, waveform $V_3(AC)$. Therefore transistor 106, having been on when transistor 24 was on as will be hereinafter described, is switched off. Current limiting resistor 110 in conjunction with diode 108 prevents damage to transistor 106.

The spike energy which would normally be produced by leakage reactance 20 is used to charge capacitor 102 via diode 100 and is therefore stored by the capacitor. Due to the large capacity of several hundred microfarads in capacitor 102, the voltage across transformer winding 16a and leakage reactance 20 is clamped by capacitor 102 as illustrated by the dashed line in FIG. 2, waveform ($V_t$) to a point just slightly more negative than the normal negative sustaining voltage at line 132 which appears at terminal 116 when transistor 24 is off. It should be noted that during the time the capacitor 102 is being charged by what would otherwise be spike energy, in accordance with waveform i(t) (FIG. 2) a current flows through capacitor 102 from the + terminal 102b to the − terminal 102a thereof.

When the next positively directed pulse occurs from pulse source 30, during a time interval $T_1$ transistor 24 is turned on applying a positive voltage to terminal 116 relative to circuit ground. In turn, terminal 118 on secondary winding 16b is driven negative such that transistor 106 becomes conductive in saturation. Therefore, the minus (−) terminal 102a of capacitor 102 is essentially clamped to ground. The plus (+) terminal 102b, having been previously charged up to some voltage above voltage at terminal 36 by energy in transformer primary 16a which would otherwise produce a voltage spike, now discharges through diode 112 and terminal 36 into load 38. In the alternative circuit, FIG. 1a, the discharge is through diode 112 and terminal 36a into winding 16b. The current provided to load 38 is illustrated in FIG. 2, waveform i(t) as negatively directed current and indicated as current going to load 38. On succeeding part cycles, this capacitor 102 is alternately charged by energy that is produced by leakage reactance 20 and discharged into terminal 36 on the other part cycle to pass what would other be wasted energy to a load. It should be noted that with the circuit 70 of FIG. 1, a load such as 38 is necessary to provide a path for the discharge of the capacitor 102. This load is normally present in any event.

What is claimed is:

1. An improved voltage converter of the type receptive of a d.c. input voltage including a transformer having primary and secondary windings, a d.c. output circuit coupled to said secondary winding for producing a d.c. output voltage of a first polarity, switching means for alternately coupling said d.c. voltage to said transformer primary for a first period and for decoupling said d.c. voltage from said transformer primary for a second period, the ratio of said first period to said second period being responsive to said d.c. output voltage, said primary winding, upon the decoupling of said d.c. input voltage thereto, producing a reversal of polarity and normally undesirably producing at one end of said primary winding, energy in the form of a voltage spike of a second polarity opposite to said first polarity followed by a sustaining voltage having said second polarity and lower magnitude than said voltage spike, said lower magnitude being substantially equal to said d.c. output voltage, wherein the improvement comprises:

means coupled to said transformer primary winding for storing said voltage spike energy and for clamping said voltage at said one end of said primary winding to substantially said sustaining voltage; and means coupled to said switching means and further coupled to said energy storage means for switchably applying energy stored in said energy storage means to said d.c. output circuit in response to and substantially simultaneously with the coupling of said d.c. input voltage to said transformer primary winding.

2. The apparatus according to claim 1 wherein said energy storage means comprises:

a first diode having first and second terminals, said first terminal being coupled to said primary winding;

a capacitor having first and second terminals, said capacitor first terminal being coupled to said first diode second terminal; and a second diode having first and second terminals, said second diode first terminal being coupled to said capacitor second terminal and said second terminal being coupled to circuit ground potential, said first and second diodes being poled to pass current to said capacitor when said transformer primary is producing voltage of said second polarity.

3. The apparatus according to claim 2 wherein said means for switchably applying said stored energy comprises:

transistor means having first, second and third terminals, said transistor first terminal being coupled to said capacitor first terminal, said transistor second terminal being coupled to said transformer secondary winding, and said transistor third terminal being coupled to said circuit ground, for coupling said capacitor first terminal to said circuit ground upon the presence of a voltage signal of said second polarity at said transformer secondary winding, said transformer being poled to produce a voltage pulse of said second polarity upon the application of a pulse of said first polarity to said transformer primary; and third diode means coupled between said capacitor second terminal and said d.c. output circuit being poled to conduct current from said capacitor to said d.c. output circuit upon said grounding of said capacitor first terminal.

* * * * *